Dec. 10, 1929.  C. C. PALMERSTON  1,738,922
DECORTICATING MACHINE
Original Filed Jan. 20, 1926  2 Sheets-Sheet 2

INVENTOR
COLIN C. PALMERSTON
By
ATTORNEY

Patented Dec. 10, 1929

1,738,922

UNITED STATES PATENT OFFICE

COLIN C. PALMERSTON, OF MONROVIA, CALIFORNIA

DECORTICATING MACHINE

Application filed January 20, 1926, Serial No. 82,410. Renewed April 9, 1929.

Although my present invention is referred to, in broad terms, merely as a decorticating machine, it is an especial object of this invention to provide means of a new and highly efficient type for removing the outer "shucks" or "husks" from nuts,—such as, for example, the so-called "Persian" or "English" walnuts, as commercially grown in Southern California, and elsewhere. Machines for the mentioned purpose have heretofore relied upon a cutting or abrading effect due to pressure maintained between wire brushes, knives, or the like, and the nuts decorticated; but it is an object of this invention to provide light-running machines, capable of handling large quantities of nuts without damage either to the nuts or to said machines, and therein to use decorticating means in which reliance is placed upon sudden blows, struck by rapidly moving parts, and upon differences in inertia,—rather than upon the mere pressure of a cutting or abrading member, as heretofore used (in continuous contact with the nut "husks").

It is an important merit of machines of the type herein described that they greatly reduce or substantially obviate damage to thin-shelled, or even to perforated-shelled nuts, as produced by some varieties of trees; and my machines accordingly render a substantially increased proportion of a walnut crop marketable as "firsts."

It is an object of my invention, which permits successive rows of nuts to be fed to a decorticating member and held within reach of projecting parts thereof for predetermined periods of time, to utilize, for a decorticating effect, fluted and rapidly-revolving rolls, or the like, of considerable length,— so that a desired capacity may be obtained either by the use of a requisite number of separate machines of a standard size or by the use of a single machine provided with a decorticating fluted roll and cooperating parts having a requisite length.

It is a further object of my invention to use, in conjunction with decorticating members of the general character described a novel nut-handling organization comprising a special feed hopper, a conveyor for elevating successive rows of nuts or other units therefrom, an apron over which such rows of nuts are successively delivered toward a decorticating member, and means for yieldably holding or returning the nuts or other units so delivered, for a predetermined time, to within reach of the rigid or other blow-striking projections upon said decorticating member; and, in preferred embodiments of my invention, all moving parts referred to may be driven from a common source of power, and the same source of power may optionally be used also in the driving of a cleaning or polishing brush to which the decorticated nuts are permitted to advance, subsequent to their engagement and decortication by said decorticating member.

Other objects of my invention, including the provision of a pivoted retaining bar or transverse gate member movable at predetermined intervals by cam means, and including also preferred details of frame construction, hopper construction and power transmission, may be best appreciated from the following description of an illustrative embodiment of my invention, taken in connection with the appended claims and the accompanying drawings, in which Fig. 1 is a side elevational view, with parts broken away, this view being taken from the direction indicated by the arrow 1 of Fig 2.

Figure 1:
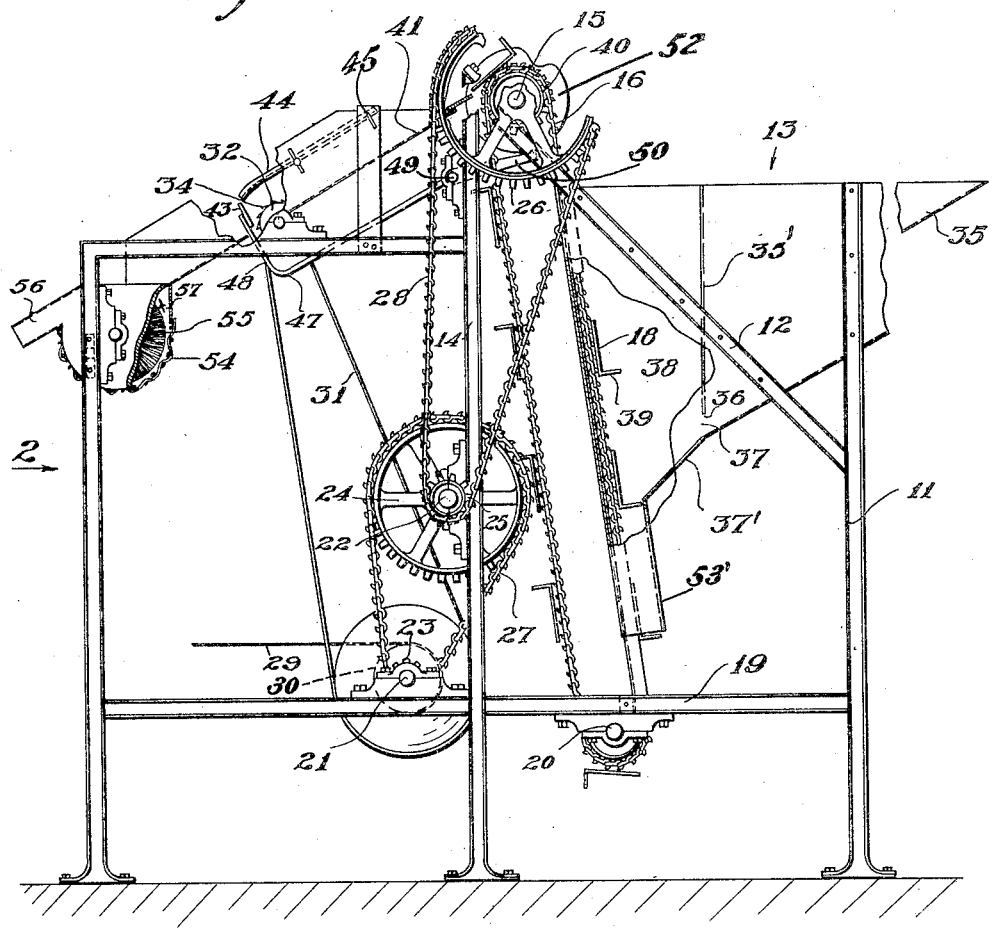

Referring to the details of that specific embodiment of my invention chosen for purposes of illustration, 11 may be a main frame, formed of channel members or other suitable cast or rolled parts, diagonal frame elements 12 being used in the support of a feed hopper 13, and a central vertical frame element 14 being used, in conjunction with the diagonal element 12, in the support of an upper shaft 15, upon which are mounted sprocket chains 16 and 17 carrying conveyor members 18. A horizontal frame element 19 is shown as used not only for the support of a lower conveyor shaft 20 but for the support of a main drive shaft 21; and the central vertical frame element 14 is shown as carrying bearings for an intermediate shaft 22, used in effecting a reduction of speed by means of a transmission. This transmission is shown as including sprocket gears 23 and 24 on shafts 21 and 22, and also sprockets 25 and 26 respectively secured on shafts 22 and 15,—the first mentioned pair of sprockets being interconnected by a chain 27, and the latter by a chain 28.

Figure 3:
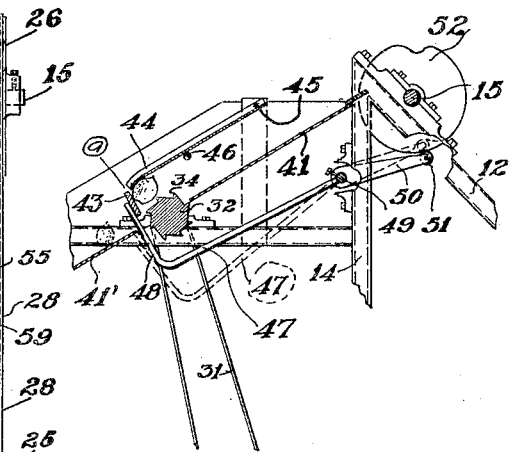
Fig. 3 is a sectional detail view, corresponding to the upper central portion of Fig. 1, and showing more particularly a preferred means of timing the periods of contact of successive rows of nuts with a rapidly rotated decorticating member.

Power delivered to the shaft 21 by means such as a belt 29 extending over a pulley 30 may be utilized not only to impart, as by the described intermedite reducing train, a comparatively slow movement to the elevating conveyor members 18, but also to impart, as by means of a chain or belt 31, a comparatively rapid rotation to a decorticating member 32, shown as provided at one end with a pulley 33 and as having the form of a horizontally disposed roll provided with longitudinal flutings and with circumferential grooves,—the resultant striking parts or projections 34 being preferably forwardly inclined and comparatively sharp, and such as to resemble, when said roll is viewed in end elevation or in transverse section (as in Figs. 1 and 3) the teeth of a saw.

It will be noted that the hopper 13 is shown as having an inclined bottom 35, of sufficient pitch to assure automatic advance of nuts, or the like, as delivered thereto, toward an intermediate partial partition 35'. The latter is shown as vertically disposed; and, whether or not it is rendered conveniently adjustable (by any suitable means, not shown) the lower edge 36 thereof is intended to be so positioned as to provide a somewhat constricted passage 37 therebelow,—so that the nuts, or other units, advancing through this constricted passage may ordinarily form a single layer, or two or three layers, upon the more steeply inclined bottom portion 37', beneath the inner compartment 38 of said hopper; and the approximately horizontal portions 39 of the respective conveyors 18 are intended to be so narrow as to hold but a single row of nuts, or the like, at a time.

As the successive substantially horizontal rows of nuts are respectively carried over the upper sprockets 40, the conveyors 18 being then tilted (as shown near the top of Fig. 1) in such manner as to deliver the rows of nuts successively upon a downwardly inclined apron 41, or its equivalent, the nuts so delivered may come almost simultaneously into contact with the teeth or projections 34 of the decorticating member 32; and, during the rapid rotation of this decorticating member, the respective nuts, although having very little inertia in comparison with that of the decorticating member 32 (which may be rotated at a rate such as 2300 R. P. M.) may be kept or returned separately within reach of the striking projections 34, or their equivalents, by means such as an intermittently movable gate member 43 and/or separately pivoted restraining fingers 44. These fingers, or their equivalents, may approximately correspond in diameter with the diameter of the nuts, or the like, to be decorticated; and all may be pivoted, near their upper ends, upon a common horizontal rod 45. The downward or inward movement thereof may be limited by means such as an adjustable transverse stop member 46. In preference to providing each of the mentioned fingers with a separate spring, I may rely largely or exclusively upon gravity to depress the same; and I may provide any preferred means for intermittently withdrawing the gate member 43, as at intervals of two seconds, more or less, as may be required for the satisfactory decortication of nuts constituting a particular batch.

To provide for the intermittent downward withdrawal of the transversely extending gate member 43, or its equivalent, relatively to the decorticating member 32 and the apron 41, or its extension 41', I may, for example, secure the ends thereof to separate levers comprising arms 47, having upwardly bent ends 48, these arms being shown as secured to or integral with a transverse shaft 49, pivotally mounted upon the upright frame elements 14. To impart movement to the arms 47, an oppositely extending arm 50 is shown as carrying, at its outer end, a projection in the form of a roller 51, engageable by a cam 52 upon the mentioned conveyor shaft 15,—so that the withdrawal of the transversely extending gate member 43 may be suitably synchronized with reference to the advance of the conveyors 18.

As indicated above, in the use of the described decorticating machine, assuming the supply of nuts, or the like, to be replenished, from time to time, by pouring the same into the hopper 13, or its equivalent, successive rows of the same are picked up by the transversely extending portions 39 of the conveyor members 18 and successively dumped upon the apron 41, rolling or sliding down the same into engagement with the projections 34 upon the decorticating member 32. When the nuts are knocked or made to "jump" by the described blow-imparting projections, or their equivalents, they encounter the fingers 44 or the gate member 43, and rapidly drop back, so that practically all portions of the surfaces of said nuts, or the like, are successively and sharply struck by the rapidly moving projections 34, the resultant dust or fragments of the shuck or husk being permitted to exit through a space 53, or through a parallel opening below the apron extension 41′ beneath the gate member 43. Damage is avoided by the fact that the nuts fly off when struck; and, after the nuts, originally constituting a single row delivered by one of the conveyor members 18, or by an equivalent handle organization, have been sufficiently exposed to the action of the roll 32, or to that of a decorticating organization equivalent to that described, each such row or batch of nuts is permitted to pass the gate 43, upon depression of the same in the described manner.

As best shown in Fig. 1, in order to avoid leakage from hopper 13, a reinforced boot or extension 53′, at the bottom thereof, should correspond in depth with the distance between conveyor members 18; and this boot may be only slightly greater in horizontal thickness than the diameter of the nuts or other units which are to be decorticated. It should moreover be appreciated that the unit-restraining fingers 44 may be entirely dispensed with, provided the chamber in which the decorticating member rotates is of such shape and is so positioned that the nuts or other units, when struck by the rapidly moving projection 34, shall be returned by gravity to receive repeated blows; but the fingers 44 are nevertheless highly advantageous, as tending to prevent the nuts or other units from quickly acquiring a rapid rotary motion opposite to that of the decorticating member 32; and the nuts or other units delivered from said member onto the apron extension 41, or its equivalent, may be separated from adherent or non-adherent associated fragments of husks, or from other foreign matter, by means of any preferred character.

Figure 2:
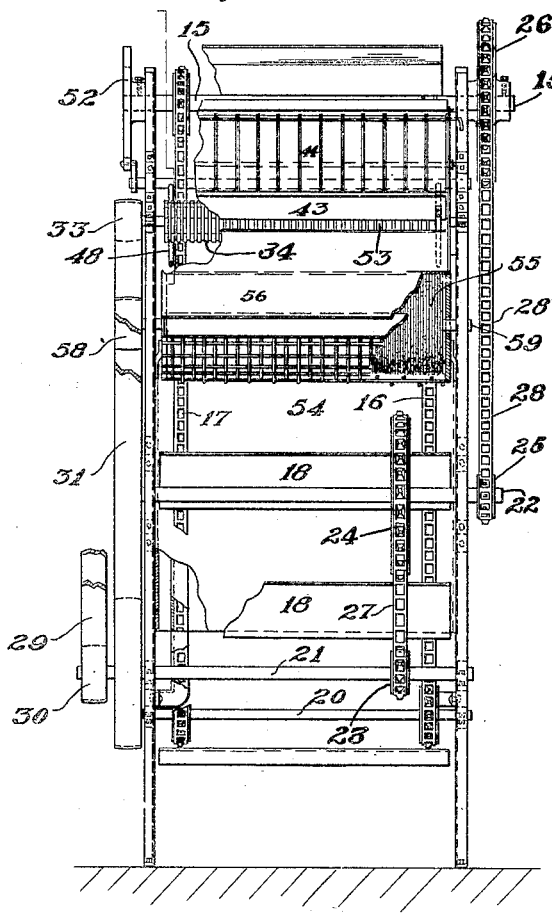
Fig. 2 is an end elevational view, taken from the direction indicated by the arrow 2 of Fig. 1, but with parts broken away and with a belt transmission arranged in a special manner, hereinafter described, slightly differing from that illustrated in Fig. 1.

For example, providing a screen in the form of a pocket 54, I may so mount and drive a brush 55 in said pocket that nuts, completely or almost completely decorticated, falling into the same shall be thoroughly cleaned by said brush (to which a liquid or powdered cleansing or bleaching or polishing or coating material may be delivered, if desired, by means not shown) before advancing thereunder or thereover toward a delivery passage or spout 56,—beneath which receiving baskets or the like (not shown) may be disposed in an obvious manner. The brush 55, when positioned as shown, is preferably rotated in the direction of the arrow 57, as by the carrying of the belt 31 over a pulley 58 on the shaft 59 thereof, in the general manner suggested in Fig. 2 (not shown in Figs. 1 and 3).

It will be seen that the capacity of a decorticating machine of the general character described may be regarded as dependent primarily upon the length of the decorticating member 32, or its equivalent; and that, using standardized side frame parts, machines differing widely in capacity may accordingly be made up by merely interposing decorticating members, and shafts of corresponding length, between such standardized frame parts; and, although I have herein described a single complete embodiment of my invention, it will be understood not only that various features thereof might be independently employed, but also that numerous modifications, additional to those herein suggested, might easily be devised, by those skilled in the art to which this case relates, without involving the slightest departure from the spirit and scope of my invention, as the same is indicated above and in the following claims.

I claim as my invention:

1. In a machine of the general character described: a frame providing support and housing for a blow-striking organization and for a handling organization, a blow-striking organization comprising a decorticating member provided with projecting parts, means for imparting rapid movement thereto, a handling organization comprising means for advancing units to be decorticated relatively to said member and means for preventing said units for predetermined intervals during which repeated blows are struck upon each unit from being prematurely driven out of reach of said projecting parts in a direction in which they are impelled by said blows.

2. In a decorticating machine relying for its effect upon a difference in inertia between the units to be decorticated and rapidly moving machine parts: a rotating member provided with blow-striking parts, means for advancing units thereto at intervals and pivotally mounted means limiting the advance of the units in the direction in which they are struck for detaining said units within reach of said parts for a predetermined period.

3. In a decorticating machine: a handling organization, rotating means for repeatedly and rapidly striking successive blows upon the cortex of units handled thereby, and yieldable retaining means whereby said units, while held against advance beyond a predetermined limit in the direction in which said striking means rotate, are subjected to repeated engagement thereby.

4. An organization of the general character defined in claim 3, in which said blow-striking means are in the form of tooth-like projections from a rotatable roll, said projections being separated by longitudinal flutings and by circumferential grooves.

5. An organization of the general character described which comprises: a handling organization, means for striking successive rapid blows for a decorticating effect and restraining means for causing the return of units hit by said striking means, said restraining means comprising separately pivoted fingers.

6. An organization of the general character described which comprises: a handling organization, means for striking successive rapid blows for a decorticating effect and in which the premature escape of units undergoing decortication by the described means is restrained by a transversely extending member.

7. An organization of the general character described which comprises: a handling or-organization, means for striking successive rapid blows for a decorticating effect and in which the escape of units undergoing decortication by the described means is restrained by a transversely extending gate, movable by cam or link motion means.

8. An organization of the general character described which comprises: a handling organization, means for striking successive rapid blows for a decorticating effect and in which the escape of units undergoing decortication by the described means is restrained by a transversely extending gate, said gate being movable by cam means synchronized with reference to the movement of conveyor members by which successive rows of units are fed toward said striking means.

9. An organization of the general character described which comprises: a handling organization, means for striking successive rapid blows for a decorticating effect and comprising means for repeatedly returning each unit, for a predetermined interval, to within reach of said striking means.

10. In a machine for removing husks from nuts, a rapidly movable impact member arranged to impart successive blows to the nuts, and means whereby the nuts are advanced to the impact member by gravity only, said impact member being arranged to strike the nuts in a direction to overcome the said gravity effect.

11. In a machine for removing husks from nuts; a rapidly movable impact member arranged to impart successive blows to the nuts, means whereby the nuts are advanced to the impact member by gravity only, said impact member being arranged to strike the nuts in a direction to overcome the said gravity effect, and means restraining the nuts from moving out of the influence of the gravity advancing effect to return the nuts successively to the impact member.

12. The combination as set forth in claim 11, with the addition of means for periodically permitting the nuts to depart from the impact member.

In testimony whereof, I have hereunto set my hand as Los Angeles, California, this 7th day of January, 1926.

COLIN C. PALMERSTON.